(12) United States Patent
Nanbu et al.

(10) Patent No.: US 6,386,578 B1
(45) Date of Patent: May 14, 2002

(54) BAG FOR PROTECTING HEAD OF AUTOMOBILE PASSENGER, PROTECTING DEVICE, AND AUTOMOBILE

(75) Inventors: Yuichi Nanbu; Yasushi Masuda, both of Tokyo (JP)

(73) Assignee: Takata Corporation, Tokyo (JP)

(*) Notice: Subject to any disclaimer, the term of this patent is extended or adjusted under 35 U.S.C. 154(b) by 0 days.

(21) Appl. No.: 09/661,908

(22) Filed: Sep. 14, 2000

(30) Foreign Application Priority Data

Sep. 21, 1999 (JP) .......................................... 11-267567
Sep. 7, 2000 (JP) ...................................... 2000-271873

(51) Int. Cl.$^7$ ............................................. B60R 21/22
(52) U.S. Cl. ................................................. 280/730.2
(58) Field of Search ........................ 280/730.1, 730.2, 280/743.1, 743.2

(56) References Cited

U.S. PATENT DOCUMENTS

| | | | | |
|---|---|---|---|---|
| 6,129,377 A | * | 10/2000 | Okumura et al. | 280/730.2 |
| 6,155,596 A | * | 12/2000 | Nakajima et al. | 280/730.2 |
| 6,168,191 B1 | * | 1/2001 | Webber et al. | 280/730.2 |
| 6,199,898 B1 | * | 3/2001 | Masuda et al. | 280/730.2 |
| 6,220,625 B1 | * | 4/2001 | Wallnet et al. | 280/730.2 |
| 6,237,937 B1 | * | 5/2001 | Kokeguchi et al. | 282/730.2 |
| 6,260,878 B1 | * | 7/2001 | Tanase | 280/730.2 |

FOREIGN PATENT DOCUMENTS

| | | |
|---|---|---|
| EP | 0 900 704 | 3/1999 |
| WO | 99/10207 | 3/1999 |

* cited by examiner

*Primary Examiner*—Paul N. Dickson
*Assistant Examiner*—Faye M. Fleming
(74) *Attorney, Agent, or Firm*—Kanesaka & Takeuchi

(57) ABSTRACT

A bag for protecting a head of an automobile passenger is formed of a main path having a gas inlet, and a cushion connected to the main path and having chambers communicating with the main path to be expand as a result of gas entering into the cushion from the main path. The chambers includes an upper chamber extending along a top side in a direction of a line extending from the main path and having one end connected to the main path; a side chamber connected to the other end of the upper chamber and extending downwardly from the top side; a lower chamber extending along the bottom side of the bag and having one end connected to the side chamber; and an intermediate chamber communicating with and disposed between the lower chamber and the upper chamber, and separated from the side chamber. The bag can expand smoothly and the required strength is reduced as a result of preventing localized excess stress.

13 Claims, 5 Drawing Sheets

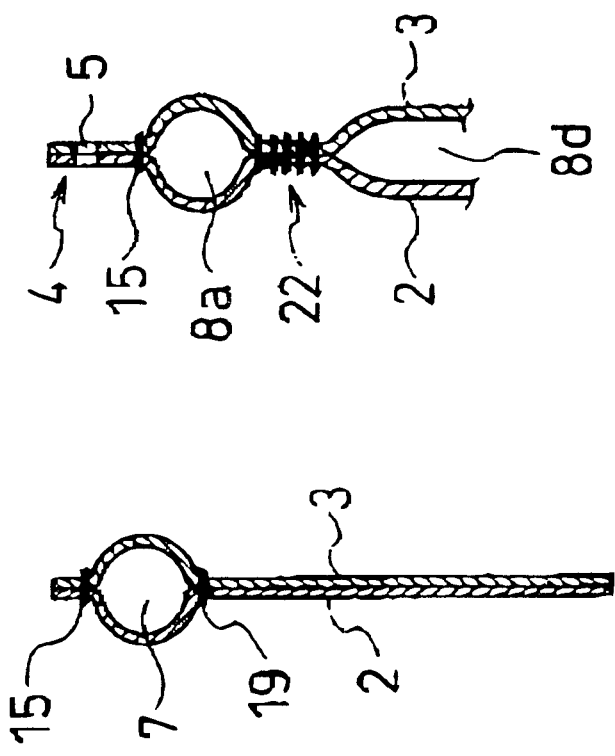
Fig. 2(a)
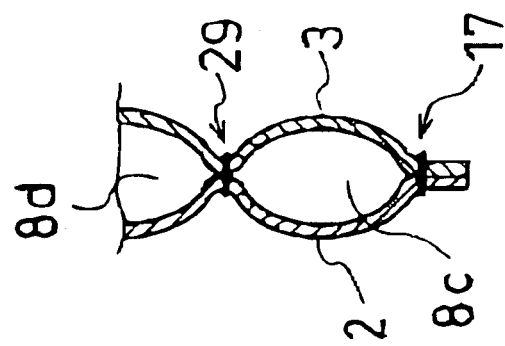
Fig. 2(b)
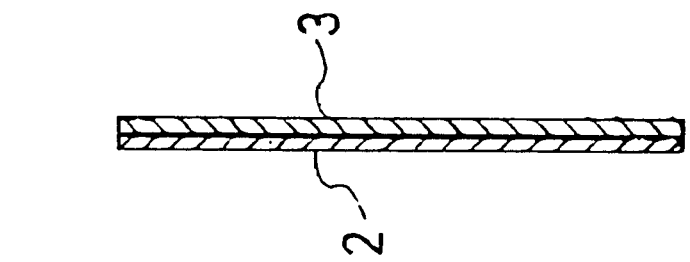
Fig. 2(c)
Fig. 2(d)

BAG FOR PROTECTING HEAD OF AUTOMOBILE PASSENGER, PROTECTING DEVICE, AND AUTOMOBILE

BACKGROUND OF THE INVENTION AND THE RELATED ART STATEMENT

The present invention relates to a bag for protecting a head of an automobile passenger, and, more particularly, to a bag which expands along, for example, a side door window and a B pillar when the automobile crashes at its side surface or turns over and lies on its side. Even more particularly, the present invention relates to a bag for protecting a head of an automobile passenger of a type in which gas enters a main gas path from a gas inlet, and then enters a plurality of small chambers from the main gas path. In addition, the present invention relates to a device for protecting a head of an automobile passenger which includes the bag, and an automobile which includes the device for protecting the head of an automobile passenger.

This type of bag for protecting a head of an automobile passenger is disclosed in WO96/26087. The bag is illustrated particularly in FIGS. 1 and 9 of the patent. The inside of this publicly known bag includes a duct, i.e. main gas path, and a plurality of cells, i.e. small chambers. The duct extends along a top edge of the bag from a front end of the bag, i.e. end of the bag located at a front side of an automobile, to a back end of the bag, i.e. end of the bag located at a back side of the automobile. The cells are connected to the duct, extend downward from the duct, and are arranged from the front end to the back end of the bag.

In the bag disclosed in WO96/26087, a gas flows into the duct from the side of the duct located at the back side of the automobile, and then into each of the plurality of cells. Therefore, it takes time to fill up all of the cells with the gas. In other words, it takes time to finish inflation of the bag. In order to reduce the amount of time required to finish inflation of the bag, it is necessary to increase the gas-generating capacity of the inflator. However, when the gas-generating capacity of the inflator is increased, excess stress is exerted onto the stitches of the bag.

GB2327066A discloses a curtain air bag whose inflation completion time is made shorter by providing X-shaped small chambers in the bag. However, since a large part of the structure of the bag is occupied by the small cells, it is inferred that the actual time required to finish inflation of the bag is not made so short.

Accordingly, it is an object of the present invention to provide a bag for protecting a head of an automobile passenger which makes it possible to sufficiently reduce the time required to finish inflation of the bag without increasing the output of an inflator, and to a protecting device and an automobile which includes the bag.

SUMMARY OF THE INVENTION

According to one aspect of the present invention, there is provided a bag for protecting a head of an automobile passenger which is disposed near a corner of an automobile where a side surface and a ceiling inside the automobile intersect and which expands downward along the side surface of the automobile as a result of gas entering the bag from a gas inlet. The bag comprises a top side disposed along the ceiling of the automobile, a main air path which is connected to the gas inlet, and a cushion including chambers which expand as a result of gas entering into the cushion from the main air path. The cushion includes a small upper chamber which extends along the top side in a direction of a line extending from the main air path, with one end of the small upper chamber being connected to the main air path, a small side chamber which is connected to the other end of the small upper chamber so as to extend downward, a small lower chamber which extends along a bottom side of the bag, with one end of the small lower chamber being connected to the small side chamber, and a small intermediate chamber which is disposed between and connected to the small lower chamber and the small upper chamber, and which is separated from the small side chamber.

In such a bag for protecting the head of an automobile passenger, the gas flowing into the main air path from the inlet flows rapidly into the cushion. The flow of the gas inside the cushion spreads to cause the small upper chamber and the small intermediate chamber to expand rapidly. After the small upper chamber and the small intermediate chamber have expanded, the gas which has passed through the small upper chamber collides with the inside wall of the cushion, smoothly changes its direction of flow, and flows into the small side chamber. On the other hand, the gas which has passed through the small intermediate chamber collides with the inside wall of the cushion, smoothly changes its direction of flow, and flows into the small lower chamber. Thereafter, from either one of the small side chamber and the small lower chamber that has finished expansion earlier, the gas flows into the other small side chamber or the small lower chamber. When the other chamber has expanded, the expansion of the cushion is completed. The small side chamber and the small lower chamber may finish expansion at about the same time.

Accordingly, at the initial stage of expansion, the small intermediate chamber and the small upper chamber close to the main air path expand rapidly. The small side chamber and the small lower chamber expand by the gas which has passed through the small upper chamber and the small intermediate chamber. Here, since the small upper chamber and the small intermediate chamber have already expanded to a sufficiently large size, the gas flows smoothly, so that a sufficient gas pressure is also applied to the small side chamber and the small lower chamber, which expand rapidly. Therefore, the cushion as a whole expands in a very short time. Accordingly, the time required to complete the expansion of the whole bag is made considerably less than that of conventional bags in which every cell is expanded.

In the present invention, it is preferable that the bag for protecting the head of an automobile passenger further comprises a front side disposed along an A pillar of the automobile, and a back side disposed along either a C pillar or a D pillar. In the bag, the main gas path extends along the front side and a front portion of the top side, and the gas inlet is formed in a lower portion of the front side.

In the present invention, in the bag for protecting the head of an automobile passenger comprising a front side and a back side, it is preferable that the cushion is disposed near an intermediate portion of the bag in a forward and backward direction along the automobile and is located near a B pillar and a back portion of a front-door window adjacent to the B pillar. In the bag, curtains which do not expand are provided between the cushion and the front side of the bag and between the cushion and the back side of the bag, respectively.

In such a bag, when the cushion expands, the curtains disposed at the front and back of the cushion are in a taut state. As a result, even if a door window opens, the cushion is not pushed out of the vehicle from the door window, and the head of a passenger is prevented from projecting out of the vehicle. Since the cushion is only disposed at the intermediate portion of the bag in the forward or backward direction, the cushion finishes expansion in a considerable short time.

According to another aspect of the present invention, there is provided a device for protecting a head of an automobile passenger comprising: any one of the bags explained above for protecting the head of an automobile passenger, and an inflator connected to the gas inlet of the bag.

According to still another aspect of the present invention, there is provided an automobile comprising the device for protecting the head of the automobile passenger.

BRIEF DESCRIPTION OF THE DRAWINGS

FIGS. 2(a) to 2(d) are sectional views taken along lines 2(a)—2(a), 2(b)—2(b), 2(c)—2(c) and 2(d)—2(d) shown in FIG. 1, respectively;

DETAILED DESCRIPTION OF PREFERRED EMBODIMENTS

Figure 1:
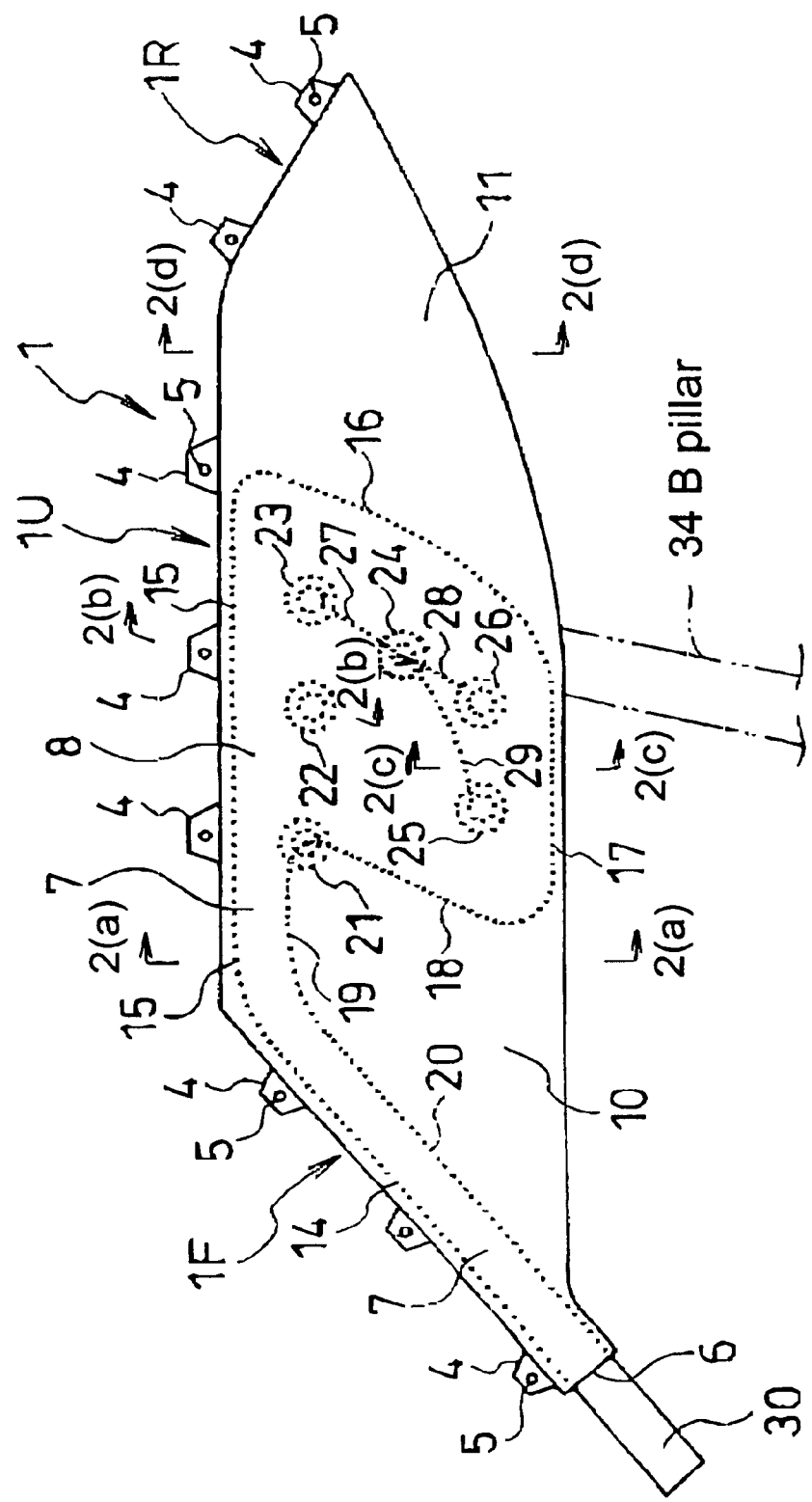
FIG. 1 is a front view of an embodiment of a bag for protecting a head of an automobile passenger in accordance with the present invention.
Figure 3:
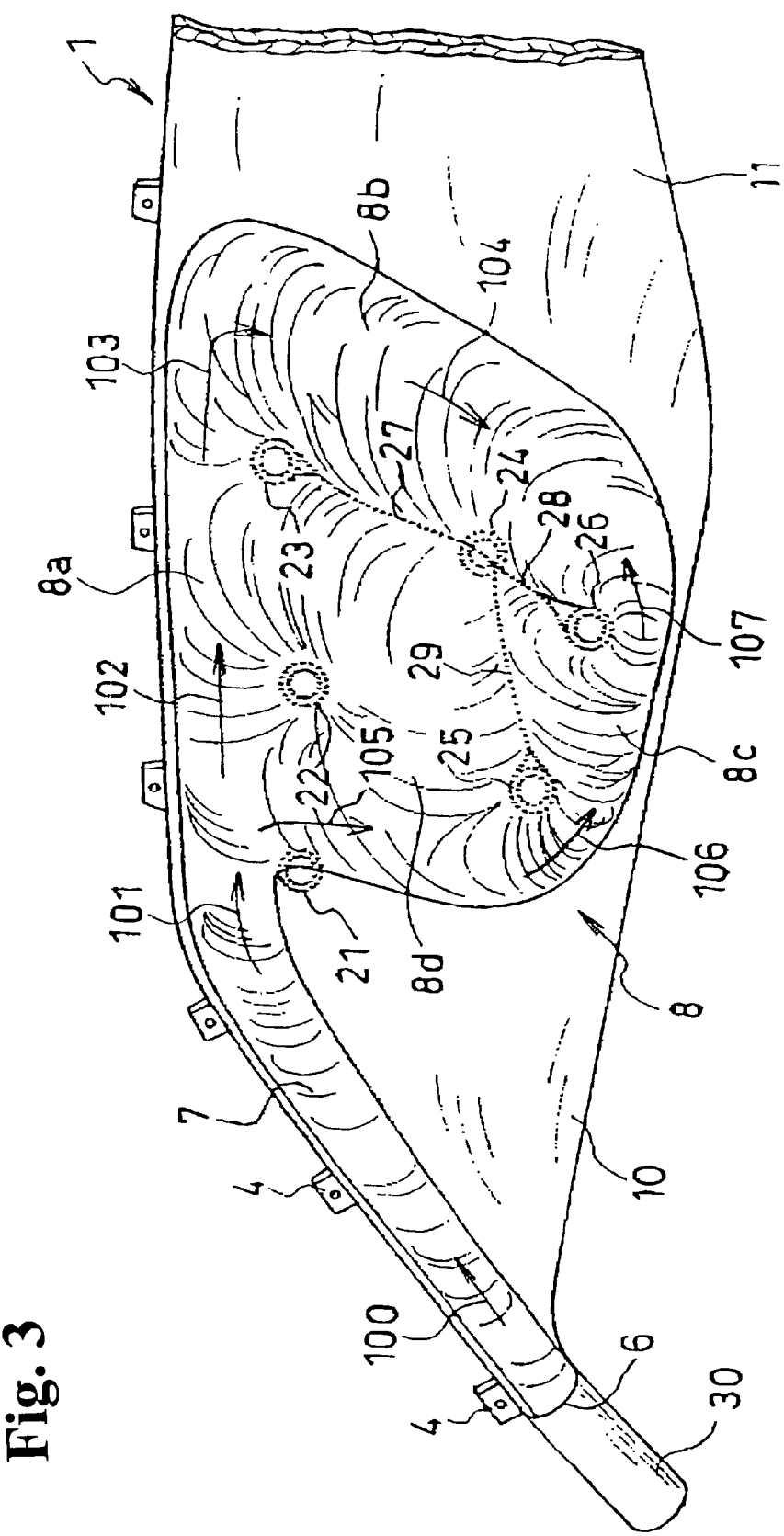
FIG. 3 is a perspective view of the bag shown in FIG. 1 during expansion.
Figure 4:
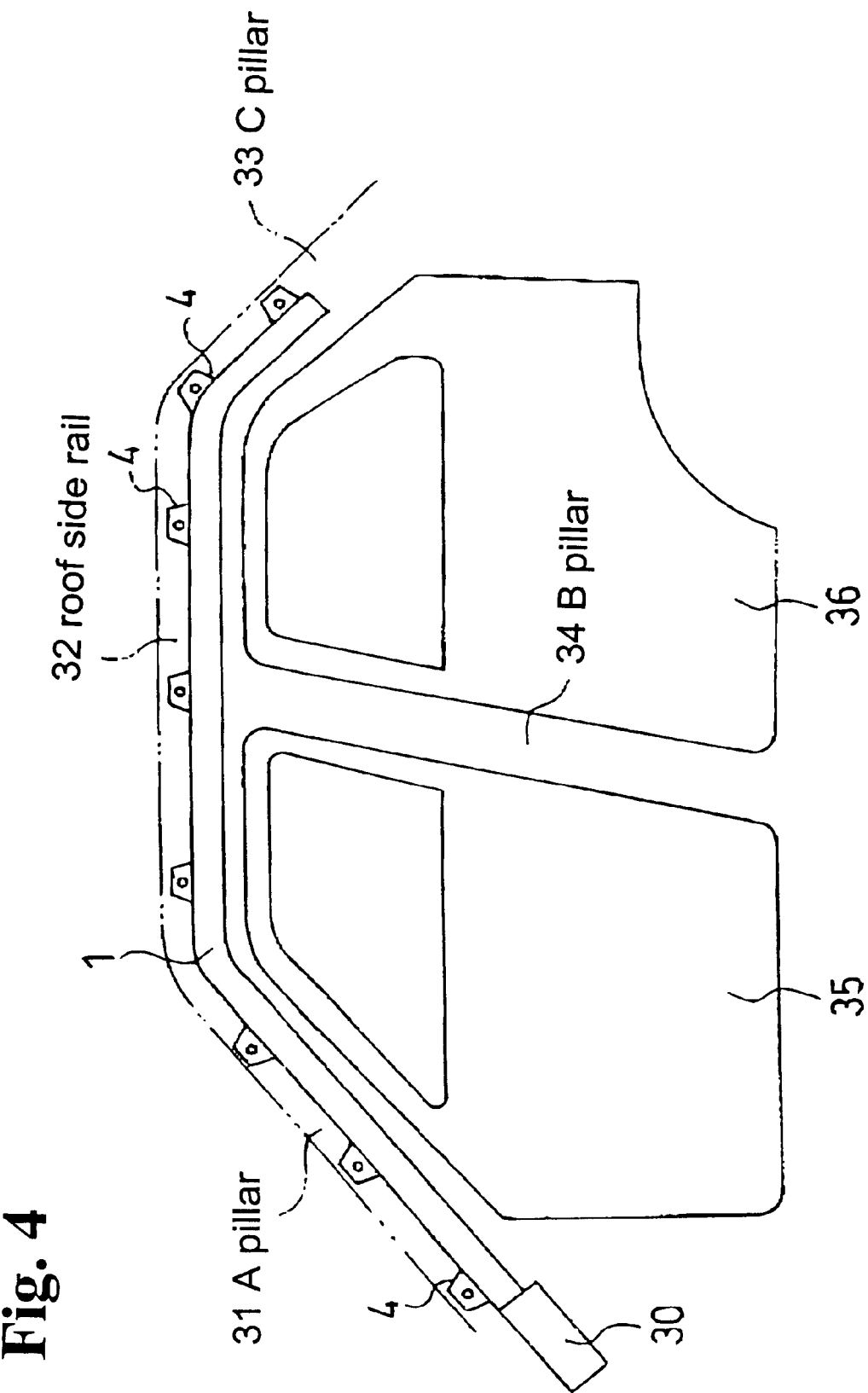
FIG. 4 is a side view of an inside of an automobile which includes the embodiment of the bag in accordance with the present invention.
Figure 5:
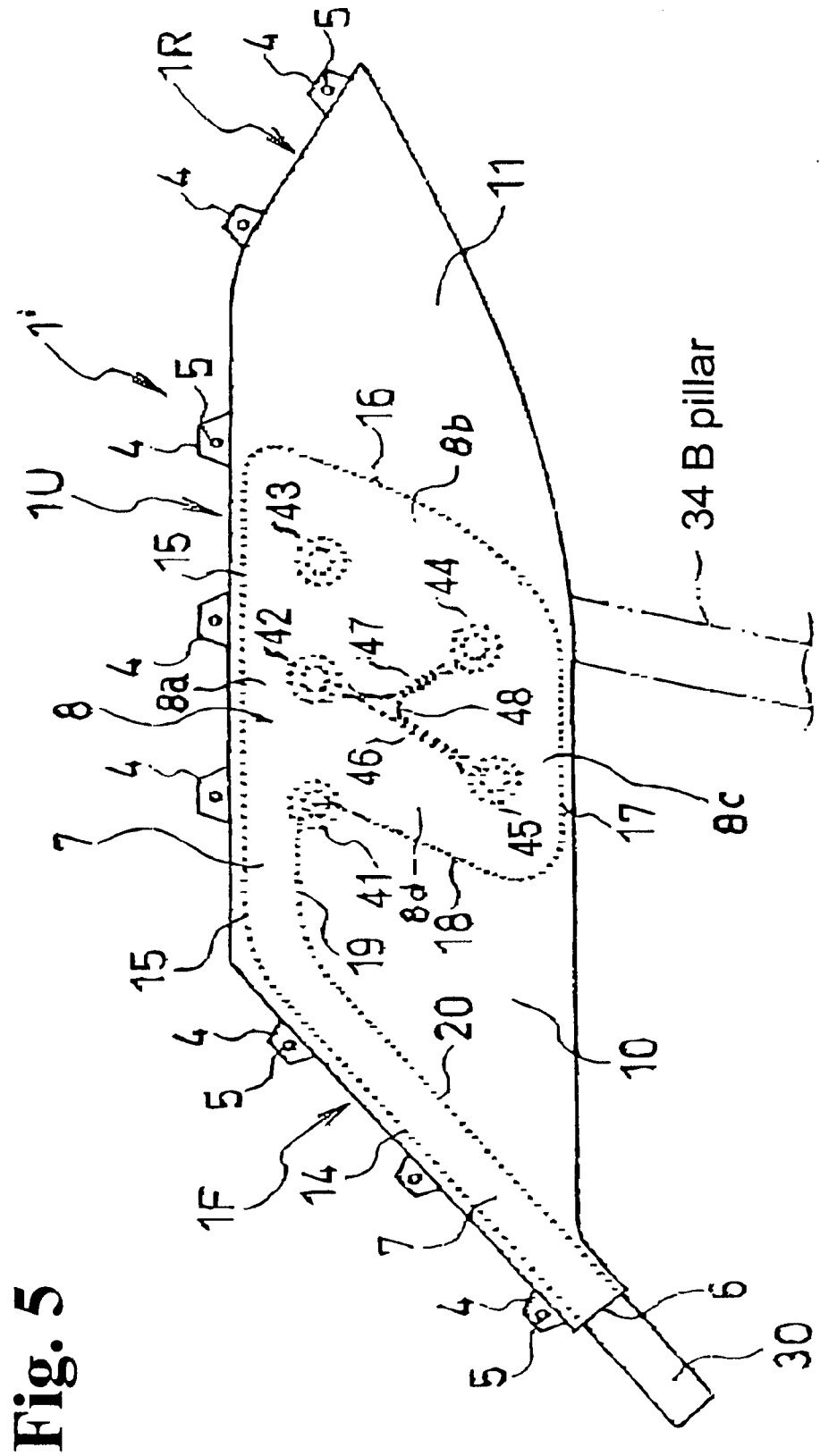
FIG. 5 is a front view of another embodiment of a bag for protecting a head of an automobile passenger in accordance with the present invention.

Hereunder, embodiments of the present invention will be explained with reference to the drawings. FIG. 1, FIGS. 2(a) to 2(d), FIG. 3, and FIG. 4 illustrate a bag 1 for protecting a head of an automobile passenger of an embodiment in accordance with the present invention. FIG. 1 is a front view of the bag 1. FIGS. 2(a) to 2(d) are sectional views taken along lines 2(a)—2(a), 2(b)2(b), 2(c)—2(c) and 2(d)—2(d) of FIG. 1, respectively. FIG. 3 is a perspective view of the bag 1 during expansion. FIG. 4 is a side view of the inside of the automobile in which the bag 1 is installed. FIG. 5 is a front view of a bag 1 for protecting a head of an automobile passenger of another embodiment in accordance with the present invention.

In the bag 1 of the embodiment of the present invention, a window-side sheet 2 and a room-interior-side sheet 3 are laminated with each other, and sewed together in order to form a main air path 7 and a cushion 8 between both of these sheets 2 and 3. Reference numerals 4 denote protrusions used to mount the bag 1 to a roof side member 32, an A pillar 31 and a C pillar 33 of the automobile. Reference numerals 5 denote receiving holes for receiving mounting means, such as rivets provided on the projections 4. Reference numeral 34 denotes a B pillar, reference numeral 35 denotes a front door, and reference numeral 36 denotes a rear door.

The main air path 7 extends along an edge of the bag 1 from a lower end of a front side 1F along the A pillar 31 to a front portion of a top side 1U. A gas inlet 6 is provided in the lower end of the front side 1F of the bag 1, and an inflator 30 is connected thereto.

The sheets 2 and 3 are joined together by linear joining sections 14, 15, 19 and 20, linear joining sections 15, 16, 17 and 18, double-ringed joining sections 21, 22, 23, 24, 25 and 26, and linear joining sections 27, 28 and 29. The linear joining sections 14, 15, 19 and 20 are used to form the main air path 7. The linear joining sections 15, 16, 17 and 18 are used to form the outer periphery of the cushion 8. The double-ringed joining sections 21, 22, 23, 24, 25 and 26 are used to join the sheets 2 and 3 more firmly together. The linear joining sections 27, 28 and 29 are used to form a small upper chamber 8a, a small side chamber 8b, a small lower chamber 8c and a small intermediate chamber 8d in the cushion 8. The sheets 2 and 3 may be joined together by, for example, sewing, bonding, or welding. However, when the sheets 2 and 3 are formed of cloth, in particular, cloth coated with synthetic resin, it is preferable to join them together by sewing.

In order to form the main gas path 7, the pair of linear joining sections 14 and 20 extend from the lower portion of the front side 1F parallel to the front side 1F, and the pair of linear joining sections 15 and 19 extend parallel to and along the upper side 1U. The linear joining section 15 extends along the upper side 1U to the back end of the cushion 8. The linear joining section 16 is connected to the linear joining section 15 and extends to the lower portion of the bag 1. The linear joining section 17 is connected to the linear joining section 16 and extends along the bottom side of the bag 1. The linear joining section 18 is connected to the linear joining section 17 and extends towards the upper portion of the bag 1 to be connected to the linear joining section 19.

The annular joining section 21 is disposed near the portion where the linear joining sections 18 and 19 are joined together. The linear joining sections 27 and 28 are provided almost parallel to the linear joining section 16. The top portion of the linear joining section 27 is separated from the linear joining section 15 by a distance almost equal to the width of the main gas path 7. The linear joining sections 27 and 28 extend substantially linearly. The bottom end of the linear joining section 28 is located above the linear joining section 17 by a required distance.

The annular joining section 23 is positioned at the top end of the linear joining section 27. The annular joining section 26 is positioned at the bottom end of the linear joining section 28. The annular joining section 24 is positioned in a middle between the annular joining sections 23 and 26. The linear joining section 29 extends obliquely forward and downward from the annular joining section 24. The front end, i.e. lower end, of the linear joining section 29 is separated from both the linear joining sections 17 and 18 by predetermined distances.

The annular joining section 22 is positioned near an intermediate portion between the annular joining sections 21 and 23. The small upper chamber 8a is formed above the annular joining sections 21, 22 and 23. The small side chamber 8b is formed between the linear joining sections 27 and 28 and the linear joining section 16. The small lower chamber 8c is formed between the linear joining sections 28 and 29 and the linear joining section 17. The small intermediate chamber 8d is formed between the linear joining sections 27, 29 and 18 and the annular joining sections 21, 22 and 23.

The annular joining section 22 forms the boundary between the small intermediate chamber 8d and the small upper chamber 8a, and prevents the small intermediate chamber 8d from expanding excessively to a large thickness.

The bag 1 does not include expanding sections other than the main air path 7 and the cushion 8, so that curtains 10 and 11 which are provided at the front and back of the cushion 8 do not expand. Although the curtains 10 and 11 are formed by placing the sheets 2 and 3 together, one of the sheets 2 and 3 may be omitted. In forming the curtains 10 and 11, the sheets 2 and 3 may be bonded together. The cushion 8 is disposed at a side of the head of an automobile passenger in accordance with the model of the automobile. Automobile passengers have different heights and various body shapes. The location and size of the cushion 8 are set so that the cushion 8 is disposed at a side of the head of a passenger of any height with different body shape.

The bag 1 is installed such that the front portion is folded along the A pillar 31 of the automobile. In addition, it is installed such that its top side is folded along the roof side rail 32, and its back side is folded along the C pillar 33.

The folded bag 1 is covered with a cover (not shown). The cover is constructed so that it tears when the bag 1 expands.

When the automobile crashes at its side surface or turns over and lies on its side, the inflator 30 operates to allow a gas to flow into the main gas path 7 from the gas inlet 6. From the main gas path 7, the gas flows into the cushion 8, causing each of the small chambers 8a to 8d to expand successively.

From the gas inlet 6, the gas flows as indicated by arrows 100 and 101 shown in FIG. 3, causing the main gas path 7 to expand. Then, when the gas flows into the cushion 8, the flow of the gas spreads as indicated by arrows 102 and 105, causing the small upper chamber 8a and the small intermediate chamber 8d to expand.

After the small intermediate chamber 8d has expanded, the gas which has flown in the direction of an arrow 105 collides with a corner formed by the linear joining sections 17 and 18 and changes the direction as indicated by an arrow 106, causing the small lower chamber 8c to expand. After expansion of the small lower chamber 8c, the gas collides with a corner formed by the linear joining sections 16 and 17 and changes its direction as indicated by an arrow 107, causing the small side chamber 8b to expand.

On the other hand, after expansion of the small upper chamber 8a, the gas which has flown in the direction of an arrow 102 collides with a corner formed by the linear joining sections 15 and 16, and changes its direction as indicated by an arrow 103, causing the small side chamber 8b to expand.

The small side chamber 8b is expanded by the gas which flows from both the small upper chamber 8a and the small lower chamber 8c, whereby the expansion of the bag 1 is completed.

Accordingly, at the initial stage of expansion, the small intermediate chamber 8d and the small upper chamber 8a near the main air path expand rapidly. Then, the small lower chamber 8c and the small side chamber 8b are expanded by the gas which has passed through the small upper chamber 8a and the small intermediate chamber 8d. Here, since the small upper chamber 8a and the small intermediate chamber 8d have already expanded to sufficiently large sizes, the gas flows smoothly, so that a sufficient gas pressure is also applied to the small lower chamber 8c and the small side chamber 8b, which expand rapidly. The gas flows into the cushion without flowing into the curtains, so that the cushion is not spread more than required by the linear joining sections 27 to 29 and the annular joining sections 21 to 26. Therefore, the amount of gas required to expand the cushion is small. Consequently, the time required to complete the expansion of the bag 1 is decreased. In addition, since the bag 1 expands quickly enough even if the gas pressure generated by the inflator 30 is small, the stress applied by the gas onto the joining sections, such as the sewing sections, between the sheets 2 and 3 is decreased. Therefore, since the required strength of the bag 1 can be made small, the sheets 2 and 3 can be easily joined together by, for example, sewing, and a thin material which has a small strength can be used for the sheets 2 and 3. When the sheets 2 and 3 are made thin, the volume required to accommodate the bag 1 when folded is made small.

FIG. 5 illustrates another embodiment of the present invention.

As in the protecting bag 1 of the embodiment shown in FIG. 1, in a protecting bag 1' of another embodiment, a window-side sheet 2 and an interior-side sheet 3 are placed upon each other and are sewed together in order to form a main air path 7 and a cushion 8 between both of the sheets 2 and 3.

The main air path 7 extends along an edge of the bag 1' from a lower end of a front side 1F along the A pillar 31 to the front portion of a top side 1U. A gas inlet 6 is provided in the lower end of the front side 1F of the bag 1', and an inflator 30 is connected thereto.

The sheets 2 and 3 are joined together by linear joining sections 14, 15, 19 and 20, linear joining sections 15, 16, 17 and 18, double-ringed joining sections 41, 42, 43, 44 and 45, and linear joining sections 46, 47 and 48. The linear joining sections 14, 15, 19 and 20 are used to form the main air path 7. The linear joining sections 15, 16, 17 and 18 are used to form the outer periphery of the cushion 8. The double-ringed joining sections 41, 42, 43, 44 and 45 are used to join the sheets 2 and 3 more firmly together. The linear joining sections 46, 47 and 48 are used to form a small upper chamber 8a, a small side chamber 8b, a small lower chamber 8c, and a small intermediate chamber 8d in the cushion 8. The sheets 2 and 3 may be joined together by, for example, sewing, bonding, or welding. However, when the sheets 2 and 3 are formed of cloth, in particular, cloth coated with a synthetic resin, it is preferable to join them together by sewing.

In order to form the main air path 7, the pair of linear joining sections 14 and 20 extend from the lower portion of the front side 1F parallel to the front side 1F, and the pair of linear joining sections 15 and 19 extend parallel to and along the upper side 1U. The linear joining section 15 extends along the upper side 1U to the back end of the cushion 8. The linear joining section 16 is connected to the linear joining section 15 and extends to the lower portion of the bag 1'. The linear joining section 17 is connected to the linear joining section 16 and extends along a bottom side of the bag 1'. The linear joining section 18 is connected to the linear joining section 17 and extends towards the upper portion of the bag 1' to be connected to the linear joining section 19.

The annular joining section 41 is disposed near the portion where the linear joining sections 18 and 19 are joined together.

The linear joining section 46 is disposed substantially parallel to the linear joining section 18 to extend substantially in a straight line. The top end of the linear joining section 46 is separated from the linear joining section 15 by a distance which is substantially equal to the width of the main air path 7, and the bottom end of the linear joining section 46 is situated above the linear joining section 17 by a predetermined distance. The annular joining section 42 is disposed near the upper side of the top end of the linear joining section 46, whereas the annular joining section 45 is disposed near the bottom side of the bottom end of the linear joining section 46.

The annular joining section 44 is disposed at required distances away from both the linear joining sections 16 and 17.

The linear joining section 47 is provided parallel to the linear joining section 46 near the annular joining section 42, is curved at a middle portion thereof, and extends to near the annular joining section 44.

The linear joining section 48 is provided along the linear joining section 46 from near the annular joining section 45, is curved at a middle portion thereof, and extends to near the annular joining section 44 along the linear joining section 47.

The annular joining section 43 is separated from the linear joining section 15 by a distance substantially equal to the width of the main air path 7. It is also spaced at a required distance away from the linear joining section 16.

The annular joining section 43 prevents the small side chamber 8c from expanding to an excessive thickness.

The bag 1' is installed such that its front portion is folded along the A pillar 31 of the automobile. In addition, it is installed such that its top side is folded along the roof side rail 32, and its back side is folded along the C pillar 33. The folded bag 1' is covered with a cover (not shown). The cover is constructed so that it tears when the bag 1' expands.

In this embodiment, there are five annular joining sections, so that there is one annular joining section less than those in the previous embodiment where there are six annular joining sections. This makes it easier for the cushion 8 to be produced by sewing. By sewing the linear joining sections 46, 47 and 48 for separating the cushion 8 to form each of the chambers as in above-described forms, the diameters of expansion of the corresponding small chambers are made more uniform than in the previous embodiment. Thus, this way of sewing allows the diameters (thickness) of the expansion of the corresponding small chambers to be more uniform, and further, equalizes the loads on these sewn portions to be applied upon expansion of the air bag.

When the automobile crashes at its side surface or turns over and lies on its side, the inflator 30 operates in order to cause gas to flow into the main gas path 7 from the gas inlet 6. From the main gas path 7, the gas flows into the cushion 8, causing each of the small chambers 8a to 8d to expand successively.

The gas from the inlet 6 first expands the main air path 7, and then, expands the small upper chamber 8a and the small intermediate chamber 8d. The gas which has expanded the small upper chamber 8a collides with a corner formed by the linear joining sections 15 and 16, and changes its direction, causing the small side chamber 8b to expand. Thereafter, the gas flows into the small lower chamber 8c from the small side chamber 8b, causing the small lower chamber 8c to expand.

On the other hand, the gas which has expanded the small intermediate chamber 8d collides with a corner formed by the linear joining sections 17 and 18, and smoothly changes its direction, causing the small lower chamber 8c to expand. The small lower chamber 8c is expanded by the gas which flows into the small lower chamber 8c from both of the small side chamber 8b and the small intermediate chamber 8d, whereby the expansion of the bag 1' is completed.

As in the previous embodiment, in this embodiment, the time required to complete the expansion of the bag 1' is sufficiently short. In addition, since the bag 1' expands quickly enough even if the gas pressure generated by the inflator 30 is small, the stress applied by the gas onto the joining sections (such as the sewing sections) between the sheets 2 and 3 is decreased. Therefore, since the required strength of the bag 1' can be made small, the sheets 2 and 3 can be easily joined together by, for example, sewing, and a thin material which has a small strength can be used for the sheets 2 and 3. When the sheets 2 and 3 are made thin, the volume required to accommodate the bag 1' when folded is made small.

Although in the above-described embodiment, the back side 1R is disposed along the C pillar, it may be disposed along a D pillar.

In the present invention, the inflator and the gas inlet of the bag may be disposed on the back portion of a vehicle, such as the B pillar, the C pillar, or the D pillar.

As can be understood from the foregoing description, the bag for protecting a head of an automobile passenger in accordance with the present invention as a whole expands more quickly than in the conventional bags. Therefore, an inflator having a small capacity can be used. The stress exerted onto the bag is decreased to make it possible to reduce the required strengths of the joining sections, such as sewing sections, and of the structural material of the bag.

While the invention has been explained with reference to the specific embodiments of the invention, the explanation is illustrative and the invention is limited only by the appended claims.

What is claimed is:

1. A bag for protecting a head of an automobile passenger, comprising:
   two sheets laminated together,
   a main path formed between the two sheets and having a gas inlet,
   a cushion formed between the two sheets and connected to the main path, said cushion including a top side to be arranged along a ceiling of the automobile, a bottom side, and chambers communicating with the main path to be expanded as a result of gas entering into the cushion from the main path, said chambers including an upper chamber extending along the top side in a direction of a line extending from the main path and having one end connected to the main path; a side chamber connected to the other end of the upper chamber and extending downwardly from the top side; a lower chamber extending along the bottom side of the bag and having one end connected to the side chamber; and an intermediate chamber communicating with and disposed between the lower chamber and the upper chamber, and separated from the side chamber, and
   first, second and third annular joining sections for partly joining the two sheets together inside the cushion to define the upper, side, lower and intermediate chambers and located at a corner between the upper and side chambers, a corner between the side and lower chambers and an end of the lower chamber away from the side chamber, respectively, each annular joining section having an annular shape.

2. A bag for protecting a head of an automobile passenger according to claim 1, wherein the bag is disposed near a corner of an automobile where a side surface and a ceiling inside the automobile intersect, said bag expanding downwardly along the side surface of the automobile as a result of gas entering from the gas inlet.

3. A bag for protecting a head of an automobile passenger according to claim 2, further comprising a front side disposed along an A pillar of the automobile, and a back side disposed along one of a C pillar and a D pillar of the automobile, said main path extending along the front side and a front portion of the top side and said gas inlet being formed in a lower portion of the front side.

4. A bag for protecting a head of an automobile passenger according to claim 3, wherein the cushion is disposed near an intermediate portion of the bag in a lateral direction so that the cushion is located near a B pillar and a back portion of a front-door window adjacent to the B pillar of the automobile.

5. A bag for protecting a head of an automobile passenger according to claim 1, further comprising curtains which do not expand by the gas, said curtains being provided between the cushion and the front side of the bag, and between the cushion and a back side of the bag, respectively.

6. A bag for protecting a head of an automobile passenger according to claim 5, wherein said bag is formed of said two sheets, at least one of the sheets having a size including the curtains, and the other of the sheets having a size at least forming the cushion.

7. A device for protecting a head of an automobile passenger, comprising:

the bag for protecting the head of an automobile passenger according to claim 1; and an inflator connected to the gas inlet of the bag.

8. An automobile comprising:

the device for protecting the head of an automobile passenger according to claim 7.

9. A bag for protecting a head of an automobile passenger according to claim 1, further comprising outer linear joining sections for defining outer peripheries of the main path and the cushion, said first, second and third annular joining sections being located inside the outer linear joining sections.

10. A bag for protecting a head of an automobile passenger according to claim 9, further comprising fourth annular joining section formed at an end of the main path adjacent the upper chamber and located at a corner of two of the outer linear joining sections, and fifth annular joining section situated between the first and fourth annular joining sections.

11. A bag for protecting a head of an automobile passenger according to claim 10, further comprising a first linear joining section extending between the first and second annular joining sections, and a second linear joining section extending from the first linear joining section to the third annular joining section.

12. A bag for protecting a head of an automobile passenger according to claim 10, further comprising a first linear joining section extending between the third and fifth annular joining sections, a second linear joining section with a curved portion extending between the second and fifth annular joining sections, and a third linear joining section with a curved portion extending between the second and third annular joining sections.

13. A bag for protecting a head of an automobile passenger according to claim 1, wherein each of the annular joining sections is a double-ringed joining section.

* * * * *